United States Patent
Riggs et al.

(10) Patent No.: US 9,832,854 B2
(45) Date of Patent: Nov. 28, 2017

(54) SYSTEMS AND METHODS FOR STABILIZATION OF DROPLET-PLASMA INTERACTION VIA LASER ENERGY MODULATION

(71) Applicant: ASML Netherlands B.V., Veldhoven (NL)

(72) Inventors: Daniel Jason Riggs, San Diego, CA (US); Robert Jay Rafac, Encinitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 236 days.

(21) Appl. No.: 14/824,280

(22) Filed: Aug. 12, 2015

(65) Prior Publication Data

US 2017/0048959 A1 Feb. 16, 2017

(51) Int. Cl.
*H05G 2/00* (2006.01)
*G01J 1/42* (2006.01)

(52) U.S. Cl.
CPC .............. *H05G 2/008* (2013.01); *G01J 1/429* (2013.01); *H05G 2/005* (2013.01)

(58) Field of Classification Search
CPC ..................................................... H05G 2/008
See application file for complete search history.

(56) References Cited

U.S. PATENT DOCUMENTS

| | | | |
|---|---|---|---|
| 6,829,261 B2 | 12/2004 | Kleinschmidt | |
| 8,872,122 B2 | 10/2014 | Schafgans et al. | |
| 2003/0201737 A1* | 10/2003 | Kleinschmidt | B82Y 10/00 315/291 |
| 2014/0191132 A1* | 7/2014 | Schafgans | H05G 2/003 250/372 |

FOREIGN PATENT DOCUMENTS

WO 2014/202585 A1 12/2014

* cited by examiner

*Primary Examiner* — David Porta
*Assistant Examiner* — Hugh H Maupin
(74) *Attorney, Agent, or Firm* — Gard & Kaslow LLP

(57) ABSTRACT

In a laser produced plasma (LPP) extreme ultraviolet (EUV) system, a droplet is irradiated by a laser pulse to produce a plasma in a chamber. This generates forces that cause the plasma to destabilize and subsequent droplets to have their flight trajectory and speed altered as they approach the plasma. This destabilization is detectable from oscillations in the amount of EUV energy generated. To reduce the oscillations by stabilizing the plasma and travel of the droplets, a proportional-integral (PI) controller algorithm is used to modify an energy of subsequent laser pulses based on the EUV energy generated in the chamber. By modifying the energy of subsequent laser pulses, the plasma stabilizes, which reduces effects on droplet flight and stabilizes the amount of EUV energy generated, allowing the plasma chamber to operate for longer intervals and to lower the amount of reserve power maintained by a laser source.

9 Claims, 3 Drawing Sheets

SYSTEMS AND METHODS FOR STABILIZATION OF DROPLET-PLASMA INTERACTION VIA LASER ENERGY MODULATION

BACKGROUND

Field

This non-provisional U.S. patent application relates generally to laser produced plasma (LPP) extreme ultraviolet (EUV) systems and more specifically to systems and methods for stabilization of such LPP EUV systems.

Description of Related Art

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between 10 and 120 nanometers (nm) with shorter wavelengths expected to be used in the future. EUV lithography is currently generally considered to include EUV light at wavelengths in the range of 10-14 nm, and is used to produce extremely small features, for example, sub-32 nm features, in substrates such as silicon wafers. To be commercially useful, it is desirable that these systems be highly reliable and provide cost-effective throughput and provide reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or cluster of material having the desired line-emitting element, with a laser beam at an irradiation site. The line-emitting element may be in pure form or alloy form, for example, an alloy that is a liquid at desired temperatures, or may be mixed or dispersed with another material such as a liquid.

In some prior art LPP systems, droplets in a droplet stream are irradiated by a separate laser pulse to form a plasma from each droplet. Alternatively, some prior art systems have been disclosed in which each droplet is sequentially illuminated by more than one light pulse. In some cases, each droplet may be exposed to a so-called "pre-pulse" to heat, expand, gasify, vaporize, and/or ionize the target material and/or generate a weak plasma, followed by a so-called "main pulse" to generate a strong plasma and convert most or all of the pre-pulse affected material into plasma and thereby produce an EUV light emission. It will be appreciated that more than one pre-pulse may be used and more than one main pulse may be used, and that the functions of the pre-pulse and main pulse may overlap to some extent.

Since EUV output power in an LPP system generally scales with the drive laser power that irradiates the target material, in some cases it may also be considered desirable to employ an arrangement including a relatively low-power oscillator, or "seed laser," and one or more amplifiers to amplify the laser pulses from the seed laser. The use of a large amplifier allows for the use of a low power, stable seed laser while still providing the relatively high power pulses used in the LPP process.

Systems currently known and used in the art typically set a fixed pulse width for the main pulse that is expected to produce the greatest amount of EUV energy under ideal conditions. The drive laser radio frequency (RF) pump power that is applied to the amplifier is then adjusted through an RF generator, which uses pulse width modulation (PWM) to adjust the duty cycle (the fraction of the operating time that RF power is generated) to obtain the maximum or desired amount of EUV energy. However, this approach is relatively slow in comparison to the operation of the system. The laser power can only be changed in small amounts from one pulse to the next, and thus when the duty cycle is changed, the system typically takes a number of pulses to change output.

SUMMARY

According to various embodiments, a method comprises: measuring, using an extreme ultraviolet (EUV) energy detector, an amount of EUV energy generated by a first laser pulse impacting a first droplet in a plasma chamber of a laser produced plasma (LPP) EUV system; calculating a first modified laser pulse energy, using an EUV controller, based on the measured amount of EUV energy generated by the first laser pulse impacting the first droplet in the plasma chamber; instructing, by the EUV controller, the laser source to deliver a second laser pulse having the calculated first modified energy thereby altering flight of a second droplet in the plasma chamber; measuring, using the EUV energy detector, an amount of EUV energy generated by the second laser pulse impacting the second droplet in the plasma chamber; calculating a second modified laser pulse energy, using the EUV controller, based on the measured amount of EUV energy generated by the second laser pulse impacting the second droplet in the plasma chamber; and, instructing, by the EUV controller, the laser source to deliver a third laser pulse having the calculated second modified energy thereby altering flight of a third droplet in the plasma chamber.

According to various embodiments, a system comprises: an extreme ultraviolet (EUV) energy detector configured to measure a first amount of EUV energy generated by a first laser pulse impacting a first droplet in a plasma chamber of a laser produced plasma (LPP) EUV system; and, an EUV controller configured to: calculate a first modified laser pulse energy, based on the measured amount of EUV energy generated by the first laser pulse impacting the first droplet in the plasma chamber, and instruct the laser source to deliver a second laser pulse having the calculated first modified energy, thereby altering flight of a second droplet in the plasma chamber; and wherein: the EUV energy detector is further configured to measure a second amount of EUV energy generated by a second laser pulse impacting a second droplet in the plasma chamber of the laser produced plasma (LPP) EUV system; and, the EUV controller is further configured to: calculate a second modified laser pulse energy, based on the measured amount of EUV energy generated by the second laser pulse impacting the second droplet in the plasma chamber; and, instruct the laser source to deliver a third laser pulse having the calculated second modified energy, thereby altering flight of a third droplet in the plasma chamber.

According to various embodiments, a non-transitory computer-readable medium has instructions embodied thereon, the instructions executable by one or more processors to perform operations comprising: measuring, using an extreme ultraviolet (EUV) energy detector, an amount of EUV energy generated by a first laser pulse impacting a first droplet in a plasma chamber of a laser produced plasma (LPP) EUV system; calculating a first modified laser pulse energy, using an EUV controller, based on the measured amount of EUV energy generated by the first laser pulse impacting the first droplet in the plasma chamber; instructing, by the EUV controller, the laser source to deliver a second laser pulse having the calculated first modified energy thereby altering flight of a second droplet in the plasma chamber; measuring, using the EUV energy detector, an amount of EUV energy generated by the second laser pulse impacting the second droplet in the plasma chamber; calculating a second modified laser pulse energy, using the EUV controller, based on the measured amount of EUV energy generated by the second laser pulse impacting the second droplet in the plasma chamber; and, instructing, by the EUV controller, the laser source to deliver a third laser pulse having the calculated second modified energy thereby altering flight of a third droplet in the plasma chamber.

DETAILED DESCRIPTION

In LPP EUV systems, a plasma is created when a droplet is impacted by a laser pulse in a plasma chamber. In an idealized model of the LPP EUV system, the created plasma does not affect, or exert any forces on, subsequent incoming droplets. However, in practice, the plasma and the impact of the droplets on the plasma do exert forces on the subsequent incoming droplets in the plasma chamber. The forces can be sonic shockwaves, pressure waves, audio waves, or other types of forces. These forces cause the subsequent droplets to alter their flight by changing speed and/or getting deflected as they approach the plasma being generated. The laser beam then makes less than ideal contact with the subsequent droplets, which further varies the resulting generated plasma and the forces generated therefrom. To counteract these effects in prior approaches, the laser source expends increasing amounts of reserve power to target an ever-widening region in which a target droplet is likely to be located. The increased power, in turn, causes the plasma to become even more unstable, thus further affecting the output of the LPP EUV system. The effects of the destabilized plasma manifest as increasing oscillations in the amount of EUV energy generated that has a deleterious effect on wafer dose control.

One challenge in plasma stabilization is that these forces are not directly measurable. Instead, they manifest as oscillations in the amount of EUV energy produced due to the varying droplet position versus laser beam targeting. As the LPP EUV system operates, the forces, and thus the oscillations, increase over time and neither droplet positioning nor laser beam targeting can be adjusted quickly enough to compensate. The prior solution, upon observing the oscillations, was to simply restart the system. However, repeatedly turning the system on and off is inefficient and can lead to further issues.

To address at least these challenges and to stabilize the amount of EUV energy generated, with the present approach the energy of the laser pulses is modified based on the change detected in the EUV energy generated by the LPP EUV system. In general, instead of continuously increasing the energy of the laser pulse using the reserve power to counteract the destabilization forces, the energy of the laser pulse is adjusted slightly, either up or down. In some embodiments, this adjustment is determined by using a proportional-integral (PI) controller algorithm to determine how much energy a next laser pulse will have. By modifying the energy of the laser pulse using the PI controller algorithm, the generated plasma stabilizes thereby reducing impact on the travel of subsequent droplets. Further, this decreases the changes in the generated EUV energy thereby improving dose control, and thus allows the plasma chamber to operate for longer time intervals and lowers the amount of reserve power needed to be maintained by the laser source.

Figure 1:
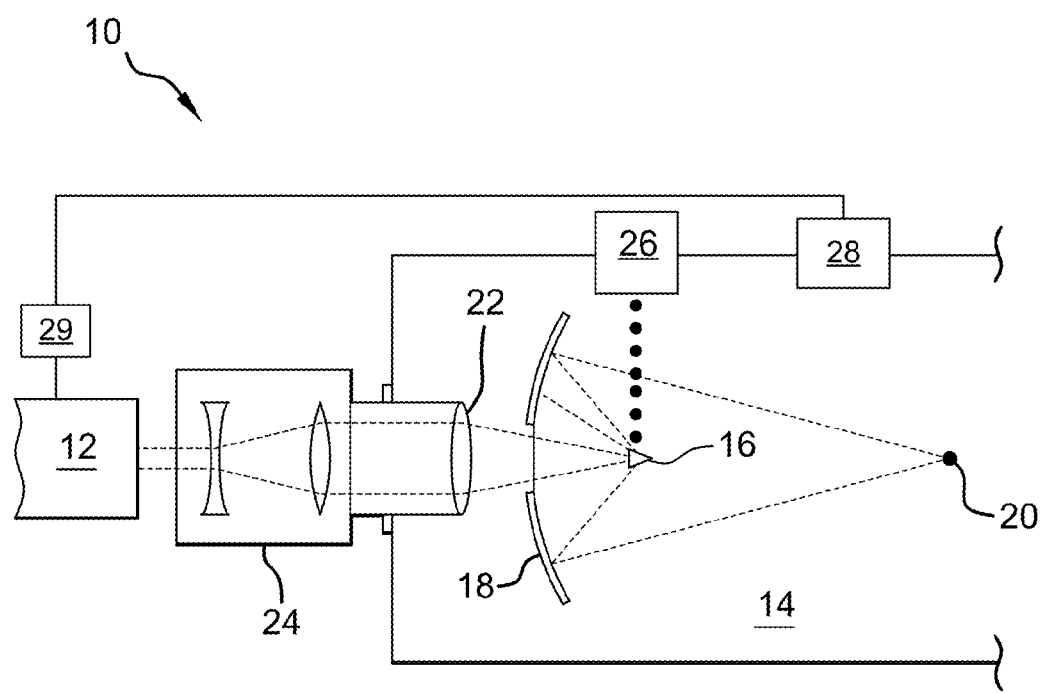
FIG. 1 is a simplified schematic view of some of the components of one embodiment of an LPP EUV system.

FIG. 1 is a simplified schematic view of some of the components of one embodiment of an LPP EUV system 10 according to the present approach. As shown, the EUV system 10 includes a laser source 12 for generating a beam of laser pulses and delivering the beam along one or more beam paths from the laser source 12 and into a plasma chamber 14 to illuminate a respective target, such as a droplet, at an irradiation site 16.

As also shown in FIG. 1, the EUV system 10 may also include a target material delivery system 26 that, for example, delivers droplets of a target material into the interior of plasma chamber 14 to the irradiation site 16, where the droplets will interact with one or more laser pulses to ultimately produce plasma and generate an EUV emission. Various target material delivery systems have been presented in the prior art, and their relative advantages will be apparent to those of skill in the art.

As above, the target material is an EUV emitting element that may include, but is not necessarily limited to, a material that includes tin, lithium, xenon or combinations thereof. The target material may be in the form of liquid droplets, or alternatively may be solid particles contained within liquid droplets. For example, the element tin may be presented as a target material as pure tin, as a tin compound, such as SnBr4, SnBr2, SnH4, as a tin alloy, e.g., tin-gallium alloys, tin-indium alloys, or tin-indium-gallium alloys, or a combination thereof. Depending on the material used, the target material may be presented to the irradiation site 16 at various temperatures including room temperature or near room temperature (e.g., tin alloys or SnBr4), at a temperature above room temperature (e.g., pure tin), or at temperatures below room temperature (e.g., SnH4). In some cases, these compounds may be relatively volatile, such as SnBr4. Similar alloys and compounds of EUV emitting elements other than tin, and the relative advantages of such materials and those described above will be apparent to those of skill in the art.

Returning to FIG. 1, the EUV system 10 may also include an optical element 18 such as a near-normal incidence collector mirror having a reflective surface in the form of a prolate spheroid (i.e., an ellipse rotated about its major axis), such that the optical element 18 has a first focus within or near the irradiation site 16 and a second focus at a so-called intermediate region 20, where the EUV light may be output from the EUV system 10 and input to a device utilizing EUV light such as an integrated circuit lithography tool (not shown). As shown in FIG. 1, the optical element 18 is formed with an aperture to allow the laser light pulses generated by the laser source 12 to pass through and reach the irradiation site 16.

The optical element 18 should have an appropriate surface for collecting the EUV light and directing it to the intermediate region 20 for subsequent delivery to the device utilizing the EUV light. For example, optical element 18 might have a graded multi-layer coating with alternating layers of molybdenum and silicon, and in some cases, one or more high temperature diffusion barrier layers, smoothing layers, capping layers and/or etch stop layers.

It will be appreciated by those of skill in the art that optical elements other than a prolate spheroid mirror may be used as optical element 18. For example, optical element 18 may alternatively be a parabola rotated about its major axis or may be configured to deliver a beam having a ring-shaped cross section to an intermediate location. In other embodiments, optical element 18 may utilize coatings and layers other than or in addition to those described herein. Those of skill in the art will be able to select an appropriate shape and composition for optical element 18 in a particular situation.

As shown in FIG. 1, the EUV system 10 may include a focusing unit 22 which includes one or more optical elements for focusing the laser beam to a focal spot at the irradiation site 16. EUV system 10 may also include a beam conditioning unit 24, having one or more optical elements, between the laser source 12 and the focusing unit 22, for expanding, steering and/or shaping the laser beam, and/or shaping the laser pulses. Various focusing units and beam conditioning units are known in the art, and may be appropriately selected by those of skill in the art.

As noted above, in some cases, laser source 12 comprises seed lasers and one or more amplifiers. The seed laser generates laser pulses, which are then amplified to become the laser beam that irradiates the target material at irradiation site 16 to form a plasma that produces the EUV emission.

One of skill in the art will appreciate that a number of types of seed lasers may be used to generate the pre-pulse and the main pulse. For example, a conventional dual-chamber transverse-flow laser source in what has traditionally been known as a "master oscillator-power amplifier" ("MOPA") configuration may be used. Alternatively, a newer type of laser known as a fast axial flow laser may be used. A single laser source may produce both the pre-pulse and the main pulse. Alternatively, separate seed lasers may be used to produce the pre-pulse and the main pulse, in what is commonly known as a MOPA+PP laser.

One type of seed laser commonly used in some embodiments of EUV systems is a CO2 laser, while other embodiments may use a YAG (yttrium-aluminum-garnet) laser. Where there are two seed lasers, they may be of different types; however, for example, a YAG laser will need a separate amplifier or amplifier chain than a CO2 laser. One of skill in the art will recognize that there are other types of lasers than CO2 and YAG lasers, and other configurations than MOPA and MOPA+PP lasers, and will be able to determine which types and configurations of lasers will be suitable for the desired application.

Returning to FIG. 1, an EUV energy detector 28 detects and/or calculates the amount of EUV power generated in the plasma chamber 14. The EUV energy detector 28 is either a sensor within the plasma chamber 14, e.g., an EUV side sensor positioned at 90° with respect to the laser beam or a sensor within the scanner measuring energy passed through intermediate focus 20. EUV energy detectors comprise photodiodes and are generally known to those skilled in the art. As is familiar to those skilled in the art, by integrating the EUV power signal of the EUV energy detector 28 over the time span that the droplet is irradiated, the EUV energy generated from the impact of the droplet and the laser pulse is calculated.

An EUV controller 29 is configured to determine an energy of a next laser pulse based on the amount of EUV energy generated by one or more previous laser pulse. The EUV controller obtains, via the EUV energy detector 28, measurements of amounts of EUV energy generated from previous pulses. The EUV controller 29 determines, using an algorithm such as a PI controller algorithm, a target energy of a subsequent laser pulse. The target energy is based on a determined stability of the plasma being generated in the plasma chamber 14. The more stable the plasma is, the higher the energy of the subsequent laser pulse can be while still maintaining the stability of the plasma. If the plasma is less stable or unstable, the EUV controller 29 can reduce the energy of the subsequent laser pulse.

The stabilization of the plasma is detectable from the amount of EUV energy generated. Oscillations in the amount of EUV energy generated are lowered, or dampened, as the plasma is stabilized using the PI controller algorithm to control the energy of the laser pulse impacting the plasma which in turn affects droplet flight. More succinctly, the PI controller algorithm reduces oscillations in the amount of EUV energy being generated by the LPP EUV system 10 by varying the energy of the laser pulse based on the amount of EUV energy being generated. By varying the laser energy based on the amount of EUV energy being generated in the plasma chamber, the generated plasma stabilizes thereby reducing the laser-to-droplet targeting variation, which results in a more consistent or stable EUV energy being generated.

The EUV controller 29 can be implemented in a variety of ways known to those skilled in the art including, but not limited to, as a computing device having a processor with access to a memory capable of storing executable instructions for performing the functions of the described modules. The computing device can include one or more input and output components, including components for communicating with other computing devices via a network (e.g., the Internet) or other form of communication. The EUV controller 29 comprises one or more modules embodied in computing logic or executable code such as software.

A pulse actuator (not shown) actuates the laser source 12 to fire the laser pulse at the irradiation site 16 per an instruction received from the EUV controller 29. Actuators can be electrical, mechanical, and/or optical components and are generally known to those skilled in the art. In one embodiment, the pulse actuator includes an electro-optic modulator (EOM) to adjust the temporal width of the laser pulse and/or an acousto-optic modulator (AOM) to adjust the height or intensity of the laser pulse. As would be understood by one of skill in the art in light of the teachings herein, adjusting either or both of the temporal width or intensity of the laser pulse can be used to vary or adjust the energy of the laser pulse according to the present approach.

Figure 2:
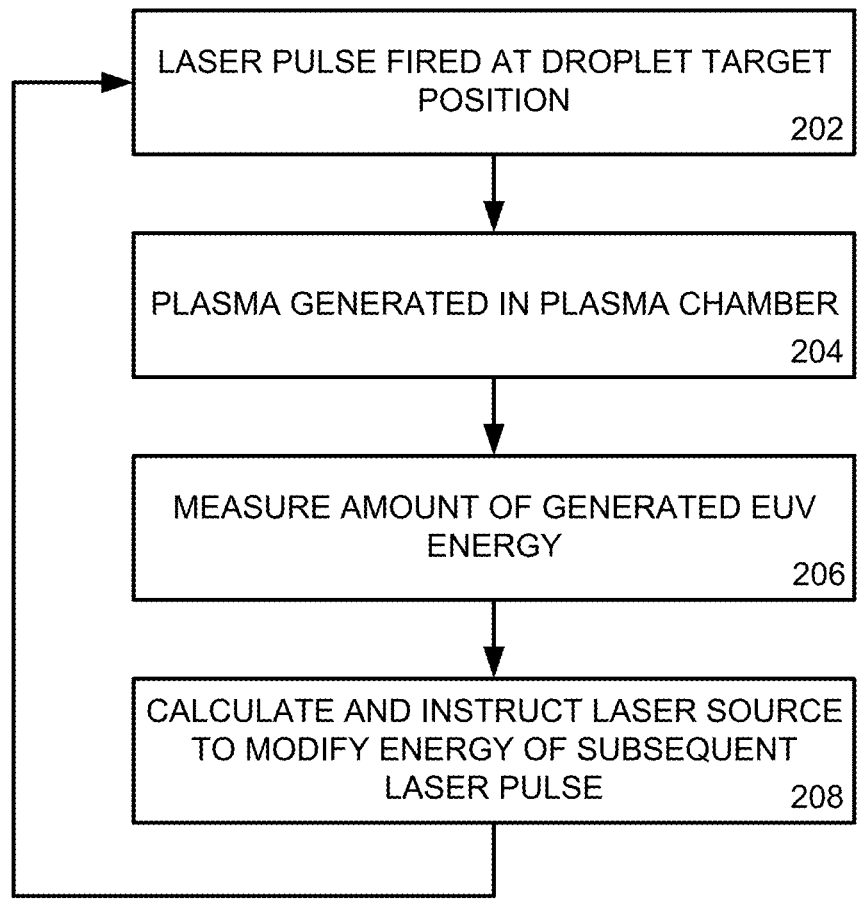
FIG. 2 is a flowchart of an example method for controlling the energy of a laser pulse, according to some embodiments.

FIG. 2 is a flowchart of an example method 200 for controlling the energy of the laser pulse, according to some embodiments. The method 200 can be performed by the EUV energy detector 28 and the EUV controller 29 of FIG. 1.

In an operation 202, the laser pulse is fired at the droplet target position. In an embodiment, operation 202 is performed by laser source 12.

In an operation 204, the plasma is generated when the fired laser pulse impacts a droplet at the droplet target position. This plasma generates EUV energy. In an embodiment, operation 204 occurs in plasma chamber 14.

In an operation 206, the amount of generated EUV energy is measured. The measured amount of EUV energy is indicative of, and proportional to, a destabilization of the plasma, which, in turn, further destabilizes the position of a subsequent droplet relative to the irradiation site 16 at the time the next laser pulse is fired at the irradiation site 16. The subsequent droplet, when not completely irradiated or when irradiated unevenly by a subsequent laser pulse, further destabilizes the persisting plasma. Without intervention, the destabilization will continue, causing ever increasing changes in the amount of EUV energy generated. The generated amount of EUV energy is measured by, for example, the EUV energy detector 28.

In an operation 208, the laser source is instructed to modify the energy of a subsequent laser pulse based on the measured amount of generated EUV energy. In some embodiments, the modified energy of the subsequent laser pulse is calculated using a PI controller algorithm such as:

$$u(t)=K_p e(t)+K_i \int_0^t e(\tau)d\tau$$

where u(t) is the PI controller algorithm output, $K_p$ is the tuning parameter for proportional gain and can be set using techniques known to those skilled in the art, e(t) is the error (e.g., the difference between the desired output and the actual output), $K_i$ is the tuning parameter for integral gain and can be set using techniques known to those skilled in the art, t is the present time, and τ is the variable of integration having the values from time zero to the present time t. The proportional term ($K_p e(t)$) produces an output value that is proportional to a current error value. The integral term ($K_i \int_0^t e(\tau)d\tau$) provides a contribution that is proportional to both the magnitude of the error and the duration of the error. The operation 208 can be performed by, for example, the EUV controller 29.

The method then returns to operation 202 with the laser now being fired using the modified laser pulse energy. Then, in operation 204, the generated plasma resulting from the modified energy of the laser pulse impacting another droplet alters the forces acting on subsequent droplets approaching the plasma and droplet target position. Stated differently, adjusting the energy of the laser pulse alters the generated forces that would otherwise cause subsequent droplets to change velocity or be deflected away from the droplet target position. This can be viewed as steering subsequent droplets towards to the droplet target position despite the subsequent droplets having already left the droplet generator and therefore no longer being mechanically steerable.

As will be apparent to those skilled in the art based on the disclosure herein, the method 200 is an iterative process whereby the PI controller algorithm is used to determine the energy of the next laser pulse so as to approach stabilization of the plasma. As will further be apparent to those skilled in the art, when the plasma is stabilized, the LPP EUV system can benefit beyond a more predictable EUV energy output. For example, because the plasma is stabilized, the energy of the laser pulse also stabilizes over time. As such, less reserve power is required by the laser source (e.g., laser source 12 of FIG. 1). Test results have shown a reduction from approximately 35% to approximately 6% in needed reserve power.

Figure 3:
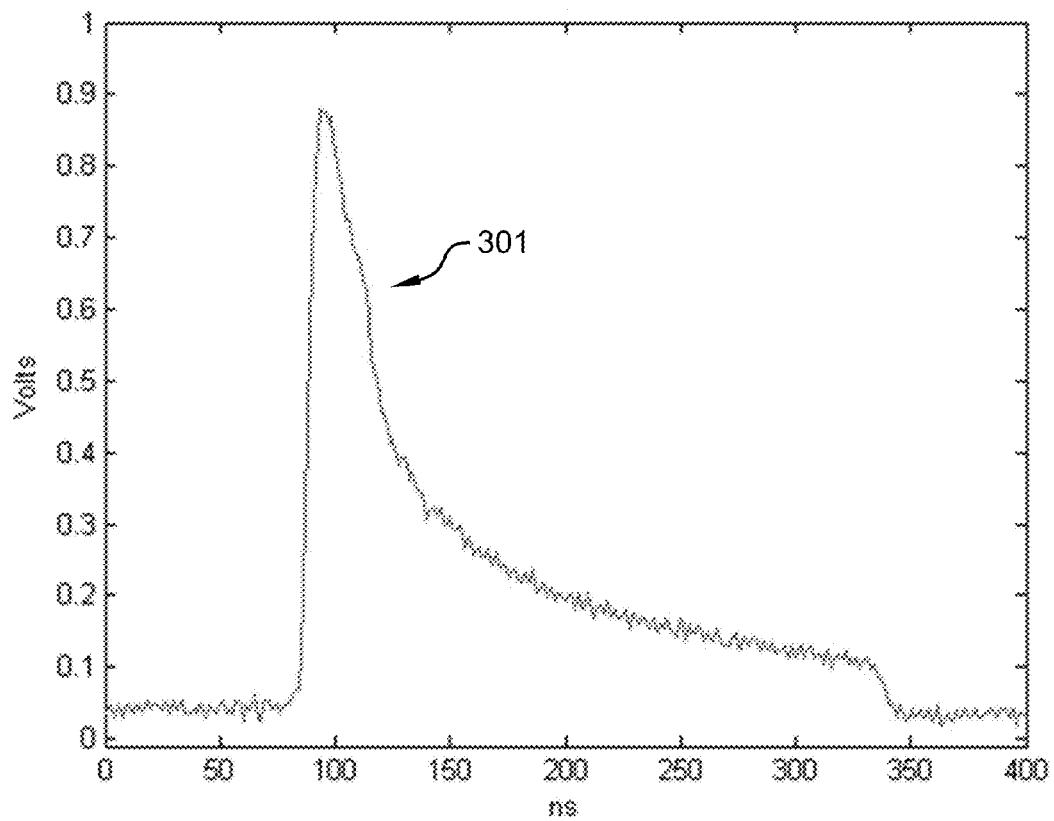
FIG. 3 is a graph of a typical main laser pulse from a $CO_2$ drive laser after it passes through an amplifier.

FIG. 3 is a graph of a typical main laser pulse from a CO2 drive laser after it passes through an amplifier, with curve 301 showing the intensity (y-axis) of the laser pulse over time (x-axis). It may be seen that the intensity falls off steeply after the initial peak; this is typical of the passing of a laser pulse through an amplifier, as the leading edge of the laser pulse saturates the amplifier and uses most of the gain as it passes. The pulse width as illustrated is approximately 250 nanoseconds (ns) from the leading edge (at about 80 ns on the x-axis) to the trailing edge (at about 330 ns on the x-axis). This is typical of a main pulse in a traditional MOPA configuration, which has generally been in the range of 100 to 300 ns, and longer than a typical main pulse in a MOPA+PP configuration, in which main pulses close to 100 ns are now used. Pre-pulses have generally been in the range of 50 to 150 ns, and may now be 30 to 70 ns. Both main pulses and pre-pulses are expected to continue to shorten in the future, possibly even into ranges measured in picoseconds.

As above, in the prior art, a pulse width that is shorter than a Q-switched pulse from the seed laser is generally selected in advance. This may be accomplished, for example, by passing the laser pulse through an optical switch, such as an electro-optic modulator (EOM), which may be located in the laser source 12 of FIG. 1 and which acts as a shutter to shorten the laser pulse, opening to allow the leading edge of the laser pulse to pass and then closing to cut off the tail end of the laser pulse at the desired point.

To stabilize the plasma, and thus the amount of EUV energy output by the LPP EUV system 10, the PI controller algorithm can adjust the pulse width of the laser pulse. To increase the energy of the laser pulse, the pulse width is increased. To decrease the energy of the laser pulse, the pulse width is decreased. The pulse width can be adjusted using techniques that are known to those skilled in the art. Likewise, as stated above, energy of the laser pulse can also be adjusted by altering the height or intensity of the laser pulse.

It is also to be understood that the controller algorithm is not limited to having to be a PI controller. Any controller which takes into account the difference in chamber forces on droplet flight versus the difference in generated EUV energy can likewise be used.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used, and possibly different types of drive lasers and/or focus lenses.

Note that as used herein, the term "optical component" and its derivatives includes, but is not necessarily limited to, one or more components which reflect and/or transmit and/or operate on incident light and includes, but is not limited to, one or more lenses, windows, filters, wedges, prisms, grisms, gradings, transmission fibers, etalons, diffusers, homogenizers, detectors and other instrument components, apertures, axicons and mirrors including multi-layer mirrors, near-normal incidence mirrors, grazing incidence mirrors, specular reflectors, diffuse reflectors and combinations thereof. Moreover, unless otherwise specified, neither the terms "optic," "optical component" nor their derivatives, as used herein, are meant to be limited to components which operate solely or to advantage within one or more specific wavelength range(s) such as at the EUV output light wavelength, the irradiation laser wavelength, a wavelength suitable for metrology or some other wavelength.

As noted herein, various variations are possible. A single seed laser may be used in some cases rather than the two seed lasers. A common switch may protect two seed lasers, or either or both of the seed lasers may have their own switches for protection. A single Bragg AOM may be used in some instances, or more than two Bragg AOMs may be used to protect a single seed laser if desired.

It should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. The program instructions can be communicated over a computer network comprising optical or electronic communication links. Such program instructions may be executed by means of a processor or controller, or may be incorporated into fixed logic elements. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method comprising:
    measuring, using an extreme ultraviolet (EUV) energy detector, an amount of EUV energy generated by a first laser pulse impacting a first droplet in a plasma chamber of a laser produced plasma (LPP) EUV system;
    calculating a first modified laser pulse energy, using an EUV controller, based on the measured amount of EUV energy generated by the first laser pulse impacting the first droplet in the plasma chamber;
    instructing, by the EUV controller, the laser source to deliver a second laser pulse having the calculated first modified energy thereby altering flight of a second droplet in the plasma chamber;
    measuring, using the EUV energy detector, an amount of EUV energy generated by the second laser pulse impacting the second droplet in the plasma chamber;
    calculating a second modified laser pulse energy, using the EUV controller, based on the measured amount of EUV energy generated by the second laser pulse impacting the second droplet in the plasma chamber;
    and,
    instructing, by the EUV controller, the laser source to deliver a third laser pulse having the calculated second modified energy thereby altering flight of a third droplet in the plasma chamber.

2. The method of claim 1, wherein calculating the first modified laser pulse energy and calculating the second modified laser pulse energy comprises using a proportional-integral (PI) controller algorithm.

3. The method of claim 2, wherein a proportional term of the PI controller algorithm is between 0.0 and 0.5 and an integral term of the PI controller algorithm is between 0.0 and 1.0.

4. A system comprising:
    an extreme ultraviolet (EUV) energy detector configured to measure a first amount of EUV energy generated by a first laser pulse impacting a first droplet in a plasma chamber of a laser produced plasma (LPP) EUV system;
    and,
    an EUV controller configured to:
        calculate a first modified laser pulse energy, based on the measured amount of EUV energy generated by the first laser pulse impacting the first droplet in the plasma chamber, and
        instruct the laser source to deliver a second laser pulse having the calculated first modified energy, thereby altering flight of a second droplet in the plasma chamber;
    and wherein:
    the EUV energy detector is further configured to measure a second amount of EUV energy generated by a second laser pulse impacting a second droplet in the plasma chamber of the laser produced plasma (LPP) EUV system;
    and;
    the EUV controller is further configured to:
        calculate a second modified laser pulse energy, based on the measured amount of EUV energy generated by the second laser pulse impacting the second droplet in the plasma chamber;
        and,
        instruct the laser source to deliver a third laser pulse having the calculated second modified energy, thereby altering flight of a third droplet in the plasma chamber.

5. The system of claim 4, wherein the EUV controller is configured to determine the first modified laser pulse energy and the second modified laser pulse energy using a proportional-integral (PI) controller algorithm.

6. The system of claim 5, wherein a proportional term of the PI controller algorithm is between 0.0 and 0.5 and an integral term of the PI controller algorithm is between 0.0 and 1.0.

7. A non-transitory computer-readable medium having instructions embodied thereon, the instructions executable by one or more processors to perform operations comprising:
    measuring, using an extreme ultraviolet (EUV) energy detector, an amount of EUV energy generated by a first laser pulse impacting a first droplet in a plasma chamber of a laser produced plasma (LPP) EUV system;
    calculating a first modified laser pulse energy, using an EUV controller, based on the measured amount of EUV energy generated by the first laser pulse impacting the first droplet in the plasma chamber;
    instructing, by the EUV controller, the laser source to deliver a second laser pulse having the calculated first modified energy thereby altering flight of a second droplet in the plasma chamber;
    measuring, using the EUV energy detector, an amount of EUV energy generated by the second laser pulse impacting the second droplet in the plasma chamber;
    calculating a second modified laser pulse energy, using the EUV controller, based on the measured amount of EUV energy generated by the second laser pulse impacting the second droplet in the plasma chamber;
    and,
    instructing, by the EUV controller, the laser source to deliver a third laser pulse having the calculated second modified energy thereby altering flight of a third droplet in the plasma chamber.

8. The non-transitory computer-readable medium of claim 7, wherein calculating the first modified laser pulse energy and calculating the second modified laser pulse energy comprises using a proportional-integral (PI) controller algorithm.

9. The non-transitory computer-readable medium of claim 8, wherein a proportional term of the PI controller algorithm is between 0.0 and 0.5 and an integral term of the PI controller algorithm is between 0.0 and 1.0.

* * * * *